United States Patent

Döllinger et al.

[19]

[11] Patent Number: 5,832,269
[45] Date of Patent: Nov. 3, 1998

[54] PROGRAMMING LANGUAGE SYSTEM FOR GENERATING A PROGRAM SYSTEM OF A REAL-TIME SYSTEM ON A HIGH LEVEL LANGUAGE

[75] Inventors: Carl-Heinz Döllinger, Germering; Andreas Hammerschick, München, both of Germany; Martin Wollensak, Nepean, Canada

[73] Assignee: Siemens Aktiengesellschaft, Munich, Germany

[21] Appl. No.: 491,994

[22] PCT Filed: Jan. 18, 1994

[86] PCT No.: PCT/EP94/00116

§ 371 Date: May 6, 1996

§ 102(e) Date: May 6, 1996

[87] PCT Pub. No.: WO94/16386

PCT Pub. Date: Jul. 21, 1994

[30] Foreign Application Priority Data

Jan. 18, 1993 [DE] Germany .................. 93 00 562 U

[51] Int. Cl.[6] ...................................................... G06F 9/44
[52] U.S. Cl. .......................... 395/702; 395/683; 395/684; 395/200.49
[58] Field of Search .................. 395/200.47, 200.49, 395/683, 684, 702, 701

[56] References Cited

U.S. PATENT DOCUMENTS 5,093,826 3/1992 Leichum .............................. 370/58.2
5,369,765 11/1994 Collet .................................. 395/700

OTHER PUBLICATIONS

Maruyama et al., "A Concurrent Object–Oriented Switching Program in Chill", Jan. 1991, IEEE Comm., pp. 60–68.
Winkler, "Object Chill—An Object Oriented Language for Telecom Applications", Int'l Switching Symp., Japan, Oct. 1992, v. 2 pp. 204–208.
K. Yuasa et al., "Network Programming Support with Object–Oriented Paradigm", Publication date 23 Mar. 1993, pp. 495–496, 498 and 500.

Primary Examiner—Emanuel Todd Voeltz
Assistant Examiner—Kakali Chaki
Attorney, Agent, or Firm—Hill & Simpson

[57] ABSTRACT

A programming language system in a high level language should comprise language means that enable a reliable and purely logical programming of a locally transparent communication between programs sequencing parallel. This is enabled by the introduction of a specific data type, that is referred to as the service type, that combines references to components (objects) of a service to form a service interface that is announced to the operating system.

10 Claims, 3 Drawing Sheets

PROGRAMMING LANGUAGE SYSTEM FOR GENERATING A PROGRAM SYSTEM OF A REAL-TIME SYSTEM ON A HIGH LEVEL LANGUAGE

BACKGROUND OF THE INVENTION

A program system for controlling a real-time system, particularly a switching system, should contain a communication mechanism that allows a flexible, loosely connected distribution of the functions onto the various processors of the real-time system. A communication mechanism is required for this purpose that enables two programs (a client program and a server program) running parallel for communication to be connected to one another without specifying the correction location.

SUMMARY OF THE INVENTION

An object of the invention is to provide a programming language system in a high level language such that a reliable and purely logical programming of the communication mechanism is enabled.

This and other objects and advantages of the invention are achieved by a programming language system for generating a program system of a real-time system in a high level language, comprising a) modules for modularizing the program system that comprise procedures and data types, that are referred to as objects;

b) a specific data type, that is referred to as the service data type, that describes a communication interface that can comprise one or more references to the objects;

c) a declaration instruction for static generation and initialization of an instance of the service type, what is referred to as a service instance, that is statically or dynamically announced to the operating system;

d) a connection instruction to the operating system for the dynamic set-up of a connection to a service, which hands over a value variable for the acceptance of the name of the requested service as well as a return parameter to the operating system as input parameters, a reference variable, that is referred to as a communication path, under whose reference data instance the operating system stores the object references of a service instance selected by the operating system; and e) communication instructions for the implementation of communications to services.

As a result of the introduction of a new data type, that is referred to as the service type, also termed service data within the programming language system, the application programmer addresses the other party to the communication on a purely logical level. The knowledge of such addresses as a processor number or a buffer address is thus no longer necessary for programmer.

As a result of the static initialization of the instances of the service data type, the later dynamic initialization of the real-time system is shortened.

When the service instances are made known to the operating system in a static fashion, only a single connection instruction is required for requesting a service instance for the dynamic set up of a connection to a service.

As a consequence of the new language means, the compiler can check the adherence to the following conventions at the point in time of development:

a) An access to a service data type is possibly only with a permanently defined built-in procedure a (connection instruction to the operating system).

b) The data type between the communication path and the data type must be compatible.

A further embodiment of the invention provides that the service data type comprises a partition field for which a corresponding value can be recited in the connection instruction and that enables an unambiguous identification of a service instance for the operating system. This embodiment makes it possible for the user to unambiguously provide a service instance required in a connection instruction. The operating system has no selection possibility between different service instances given such a connection instruction.

A further embodiment of the invention provides that the partition field of a service instance can be statically seized within the framework of the declaration instruction. Due to the static occupation of the participation field, the initialization of the program system generated with the assistance of the programming language system is shortened in this embodiment of the invention when bringing up the appertaining real-time system.

A further embodiment of the invention provides that the partition field of a service instance can be dynamically seized by a specific instruction and the availability range of this service instance can thus be dynamically varied. The dynamic occupation of the participant part in this embodiment of the invention enables a later modifiability of the participation field and, thus, a greater flexibility with respect to the conditions to be modified later. For example, a specific range of sets can require a greater capacity of service at a later point in time.

A further embodiment of the invention provides that the service type comprises a version identifier field or token via which a service instance tells the operating system what version the service that is accessible via this service instance comprises. The version identifier makes it possible to reroute the communication traffic of the software sequenced via messages onto a newly introduced software during operation of the real-time system and, thus, makes it possible to implement a software replacement during operation. This rerouting is achieved in that those modules that are affected by the software exchange must indicate the new version identifier in their request when setting up a communication relationship to a server module and the operating system thereby selects the new service instance of the new server module.

A further embodiment of the invention provides that the service type comprises a system status field via which a service instance can instruct the operating system to ignore certain system statuses, such as load status or operating status, in view of the implementation of this request given a request of a service via this service instance. By introducing a system status field into a service type, this embodiment makes it possible for the user to effect that this service is also implemented by the real-time system in case of special system conditions.

A further embodiment of the invention includes a service module that can only export service interfaces as external objects. What the service module assures is that only service interfaces are exported beyond the boundary of a service module, which can have been already checked by the compiler at the point in time of development. This means that a communication between services of different service modules can exclusively ensue by messages and, thus, not on the basis of mechanisms having common data.

The service module thus represents a software unit that meets the critical prerequisite for the exchangability during the operation of the realtime system, namely the condition of exclusive communication traffic via messages.

Another embodiment of the invention provides that a) one of the communication instructions for the implementation of the communication to a service is a remote procedure call;

b) the programming language system generates a transmission procedure in the translation of the remote procedure call, this transmission procedure comprising a procedure object reference as a parameter;

c) the transmission procedure decides on the basis of the value of the procedure object reference whether the remote procedure call is truly remote or not remote, i.e. whether it is local;

d) the transmission procedure in case of a remote procedure call that is truly remote packages the parameters of the remote procedure call into a message and sends the latter to the reception buffer of the appertaining remote procedure; and e) the transmission procedure directly calls the called local procedure in case of a local remote procedure, while specifying the value of the procedure object reference.

What this embodiment assures is that, given a local remote procedure call, the communication with the appertaining remote procedure is not implemented via a message, i.e. via the operating system but via a local procedure call, this correspondingly improving the dynamics of the system.

BRIEF DESCRIPTION OF THE DRAWINGS

An exemplary embodiment of the invention shall be set forth in greater detail below with reference to the drawings.

DETAILED DESCRIPTION OF THE PREFERRED EMBODIMENTS

A distributed system, for example a switching system, should contain a communication mechanism with which two programs running parallel (a client program and a server program ) can be connected for communication without specifying the location. In order to be able to program this connection on a high level language, new language-defined objects are introduced in CHILL (CCITT High Level Language) that enable a location-transparent and replica-transparent addressing.

The communication mechanism shall also be referred to below as "service addressing".

The entire software is subdivided into containers, namely into capsules, service modules and elementary modules.

The capsule is a closed address space and forms the container for central resources such as heap and timer. The content of a capsule is defined by the specification of the service modules.

The service module is the union of elementary modules that functionally belong together and that make one or more services available to the overall system. The service module can be embedded off line into any desired capsule.

An elementary module contains all data and procedures that are necessary for the implementation of a service.

The service module is declared on the design level and serves the purpose of being able to relocatably construct the software. What this essentially means is that interfaces between service modules are only allowed to be dynamically constructed and only communication facilities are allowed to be activated, i.e. no direct data accesses and procedure calls are possible.

The user declares service types in the server service module that are an abstract data mode, that are composed of sets of interface objects such as buffer and remote procedures and that syntactically denote the interfaces of a service.

In order to assist enhancement and location transparency, the objects and rules for a communication in a distributed system are allocated to a higher-ranking instance. For this reason, the objects are embedded into the language CHILL for the setup of a communication. The compiler makes structures available in order to be able to define these new objects in CHILL and checks the adherence to the application rules. Rules exist for the setup and after the setup of a communication path.

The objects for setting up a communication path are called "services" in the new CHILL. These services contain UBIs (Unique Buffer Identifiers) of buffers for asynchronous communication and remote procedures for synchronous communication (see the later CHILL language description).

A table about all services in the system a (global service table) arises due to the embedding into the language system. An unambiguous number a (service identifier) is assigned for every service by the system constructor or (configuration system) and this is employed later on line as an index.

The following advantages derive as a result of the recited means:

1. The compiler can have already checked adherence to the following conventions at the point in time of development:
   a) Only services are allowed to be exported and imported as communication interfaces.
   b) The accesses to services is only possible with permanently defined built-in procedures.
   c) The mode compatibility between a communication path and a service is likewise checked.
   d) Upon activation of the service, the compiler checks the mode compatibility of the interfaces to the server. Given asynchronous communication: the mode of the message and the mode of the reception buffer elements are checked.

Given synchronous communication: the modes of the parameters are checked.

2. Due to the introduction of the services in the language system, the user addresses the other party to the communication a high level language in that the programmer uses service names. The compiler then forms corresponding service identifiers from the service names. The operating system ultimately knows the service identifiers and the real addresses such as, for example, a processor number or a buffer address.

3. The compiler prepares the global service table at the point in time of the production and defines the memory area for the communication paths as UBI tables.

Figure 1:
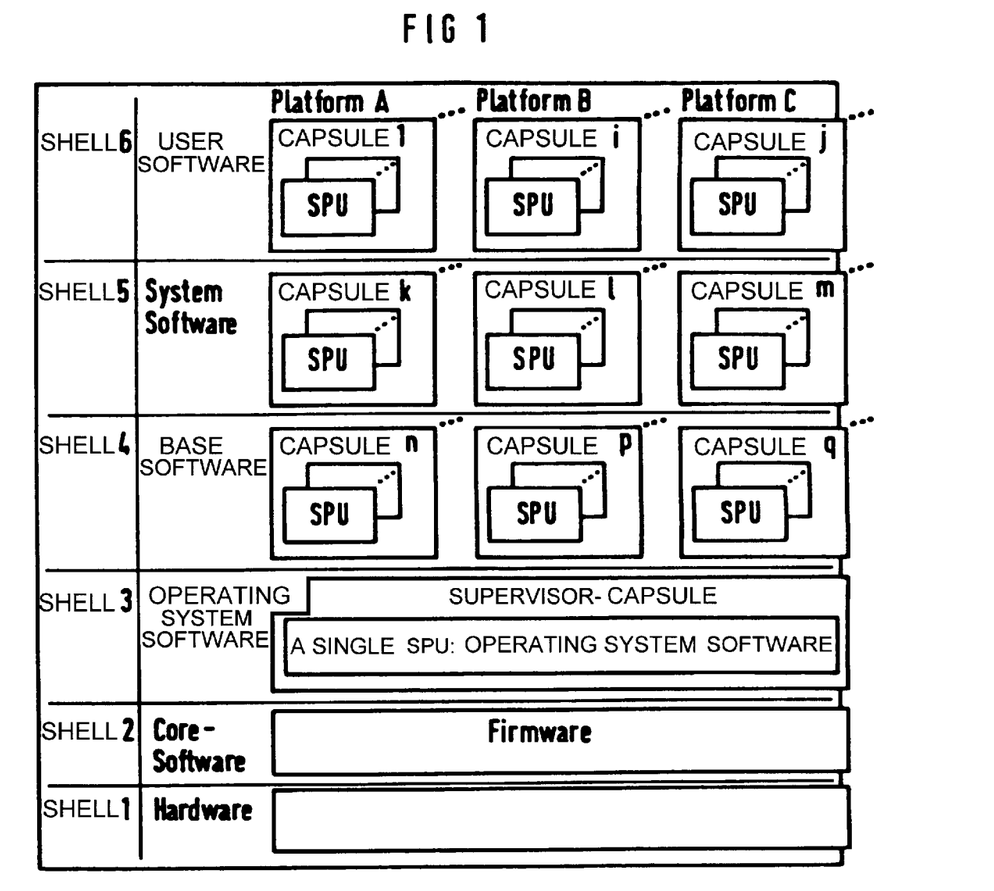
FIG. 1 shows an onion diagram for processing platforms of a distributed control system that is realized with the assistance of the inventive programming language system.

FIG. 1 shows an onion diagram for processing platforms of a distributed control system that is realized with the assistance of the inventive programming language system. The onion diagram comprises the following shells:

a first shell that corresponds to the hardware of the three processing platforms under consideration, a second shell that corresponds to the firm wear such as the (initial program loader, hardware interface, error recognition, etc.) of the processing platform, a third shell that corresponds to the operating system software the (operating system core, and error handling), a fourth shell that corresponds to the base software the (data base, overload control, etc.) of the processing platform and that comprises a plurality of software units, that are referred to as capsules, a fifth shell that corresponds to the system software the (recovery software, etc) of the processing platform and that likewise comprises a plurality of capsules, a sixth shell that corresponds to the user software the (switching technology, user interface, protocol sequencing, etc.) of the processing platform and that likewise comprises a plurality of capsules.

Only the software sequencing above the second shell is combined in service modules SPU and in capsules. The shells 1–3 together represent the basic processing platform and are the same for every processing platform type.

CHILL (CCITT (International Telegraphic and Telephone Consultive Committee) High Level Language) is a modular programming language with a strict type concept. CHILL programs are divided into modules that exchange objects with GRANT ("export") and SEIZE ("import") commands. These modules are also referred to below as elementary modules.

A system of modules can be combined to form what is referred to as a service module a ("service provisioning unit"). The service module then represents a visibility limit for all identifiers granted by the combined modules. Service modules form a relatively self-contained software system; they always belong complete to a closed address space.

Service modules also exchange objects with GRANT and SEIZE commands. Whereas, however, ordinary CHILL modules can nearly all export and import objects defined on a global level (for example, variables, procedures, constants and modes), service modules are only allowed to export/import scaler constants, modes (types) and services.

"Services", which shall also be referred to below as service instances, serve the purpose of combing certain services and information (procedures and data) and of making then known to the operating system OS, to a global service manager of the operating system, to be more precise. When a service module makes a certain service available via a service instance that another SPU requires, then a request is made to the service manager dynamically at the running time that the service manager satisfies from the providers that he has.

The presentation of service instances in the programming language CHILL shall be set forth later.

The classic communication between two software units occurs in the switching software via the sending of messages to message buffers. Such buffers, which can accept messages, are defined with the keyword BUFFER in CHILL.

In classic buffer communication, the address of the receiving buffer must be known for transmitting. So that messages can also be exchanged between buffers that do not lie in the same address space, however, in a distributed system, what are referred to as "remote references" must be defined, these communicating with one another with specific supervisor calls.

In CHILL, a remote reference is defined with

<bound remote reference mode>:=REF <>REMOTE_REFERENCE<><buffer mode>

A remote reference variable is then declared with

DCL <name><bound remote reference mode>;

With the assistance of the operating system, a buffer address is completed to form a UBI (unique buffer identifier) and is stored in such a remote reference location.

There can be procedures within the modules of a service module whose services are also required by other SPUs. In order to make these services known to the outside, the procedure cannot be granted from the service module (that is forbidden) but must first be specifically identified:

<name>: PROC ( [<formal parameter list>]) <>REMOTE_PROCEDURE<>;

This procedure must then be embedded into a service that can be granted to other service modules.

A remote procedure mode is a formal type that has the same properties and parameters as a corresponding procedure.

In the CHILL sense, a service is a variable an (instance) declared on the SPU level with the DCL ("DeCLare") command. The mode or (type) of this variable, which is referenced below as service mode or service type, is either seized by another SPU or is defined in an elementary module of the current SPU.

Service modes are defined via a CHILL-STRUCT mode and are specifically identified by a compiler directive.

The component modes of a service mode contain management information for the OS and the actual "services", namely remote reference modes and remote procedure modes.

The syntax of the service mode in CHILL follows:

```
<composite mode> ::= <service mode>
<service mode> ::=
      STRUCT (
            <partition field>            ,
            <service attribute field>    ,
            <service field list>         )
                         <>SERVICE<>
<partition field> ::=
      <field id>   { <set mode> | <range mode> }
<service attribute field> ::= <fixed field>
<service field list> ::=
      <service field>
         .  { , <service field> }*
<service field> ::=
      <field id>
{   <remote procedure mode name>
 |  <remote reference mode name>
 |  RBF <>REMOTE_REFERENCE<> <buffer mode name>}
<service declaration> ::=
      <defining occurrence list> <service mode name>
      INIT := (:
            <constant value>,
              <reference value list>
                     :)
<reference value list> ::=
      <reference value>
      { , <reference value> }*
<reference value> ::=
      <remote procedure name> | ADDR ( <buffer name> )
```

The semantics of the syntax of the service mode shall be set forth in greater detail below.

The first field of the service mode is the partition field and serves for OS (operating system) management. Its mode must be SET or RANGE of INT; which is employed by the OS for the identification of the service.

The second field, that is referred to as the system status field, also serves the purpose of OS management. Its mode is a specific powerset mode; it informs the OS what system statuses are to be ignored when laying claim to this service instance.

Thereafter, an arbitrary plurality of service components (but at least one service component) can be specified by the mode remote procedure or remote reference.

The declaration of the service variables is implemented via a DCL statement, followed by a static INIT (initialization). This static initialization is the single possibility of allocating the components of a service to procedures or buffers. An allocation to service components is not allowed; service variables are only allowed to be employed in SVC (supervisory call) calls.

The procedures and buffers that are allocated to the service in the static INIT must have been defined in elementary modules of the same service module.

A service instance an (initialized service variable) is made known to the operating system either statically (i.e. at the time of reduction of the real-time system) or dynamically (i.e., at the running time of the real-time system).

Whereas the static disclosure is implemented by the configuration system, the dynamic disclosure ensues on the basis of an explicit instruction an (announce instruction) to the operating system. The dynamic announcing, moreover, is expressed in the initialization of a service instance in that the partition field is initialized only with a dummy.

A code example of that stated in CHILL shall follow later.

A dynamically announced service can be reported as being no longer available ("withdrawn") when, for example, the corresponding server leaves the network.

The dynamic announcing and withdrawing is realized in CHILL via two built-in routines that directly branch into the OS and have the following syntax:

```
<announce service built-in routine call> ::=
    ANNOUNCE_SERVICE (
        <service name> ,
        <partition value> );
<withdraw service built-in routine call> ::=
    WITHDRAW_SERVICE (
        <service name> ,
        <partition value> );
```

The connection instruction "CONNECT_SERVICE" shall be set forth in greater detail below.

When a client requires a specific service, the client must set up what is referred to as a communication path between himself and the server. This server is identified via the partition ID. With reference to the partition ID, the service manager seeks an available server and sets up the connection.

```
<connect service built in routine call> ::=
CONNECT_SERVICE (
        <communication path>    ,
        <service id>            ,
        <unit>                  ,
    [   <partition.             , ]
        <token>                 ) ;
<communication path> ::= <reference variable name>
<unit> ::= <unit value>
<partition> ::= <partition value>
<token> ::= <token value>
```

The most important parameter is thereby the <communication path>. Formally, its mode is a REF SERVICE_MODE. Memory is reserved for it in the data module of the client into which the service manager writes the UBIs/remote procedures of the requested services.

After a CONNECT_SERVICE, the components of the service are known to the client. He can then access this via the <communication path>and call in the remote procedures or send messages to the UBIs.

The syntax of a call from CONNECT_SERVICE as well as the subsequent call of a remote procedure (PROC1) and of a sending of a message (using the CAST command) are set forth below.

```
L_RESULT := CONNECT_SERVICE ( COMM_PATH,
                              SERVICE_VAR,
                              ONSMV01_ANY_GP,
                              ID_2, /* Partition */
                              TOKEN );
IF L_RESULT = SUCCESS_OK
THEN
DO WITH COMM_PATH->;
    PROC1 (1, C);                   /* call remote proc. */
        ON ( BUFF_OVERFLOW) : ;
        ELSE;
        END;
    L_SUCCESS := CAST ( UBI_1,  /* cast message to ubi */
                        L_CALL_MESSAGE );
    OD;
FI;
```

So that these remote procedure calls function, some additional code must still be generated in the compiler in order to supply the necessary support. This is set forth in greater detail below.

As already explained, remote procedures are procedures that a service module can include in a service and that can be employed by other service modules in this way, i.e. "can be called".

The language means visible for the user convey the impression that what is hereby really involved is a call in the traditional sense. Since, however, services can also be exported into other address spaces, it is clear that a remote procedure call (referred to as RPC below) cannot be a matter of a traditional procedure call in the classic sense. On the contrary, the compiler must generate additional code in the definition of a remote procedure and in the call of a remote procedure component.

Remote procedure calls are realized via a generated CAST ("transmit") and RECEIVE sequence. By contrast to traditional calls, namely, it is possible to send messages to buffers across SPU boundaries and even across address space boundaries via the supervisory call (SVC) "CAST" and the language means "remote reference", since remote references define unambiguous buffers Ids system-wide. This is used for remote procedure calls; what thus looks like a normal procedure call for the user is in reality a sending of messages.

Since every remote procedure can be potentially embedded into a service and can be employed (called) from the outside, a buffer (the "stub buffer") is required for it, the stub buffer receiving the messages that come from the remote callers. This buffer is implicitly created by the compiler in the definition of a remote procedure.

Further, a process is implicitly generated (the "incoming stub process") that reads this buffer out and calls the procedure as soon as a message arrives. This process lies in the same SPU as the remote procedure and can thus call the procedure.

The buffers and remote procedures are announced to the compiler in the static INIT within the declaration instruction DCL of a service variable, namely those that the service should contain. They derive from elementary modules of the same service module.

The compiler thus creates memory location for every service declaration in the data module of a service module in order to deposit the addresses of the buffers and remote procedures there. The principal information is composed of link control instructions, i.e. information to the linker about the buffers and procedures to be entered here.

The compiler must thereby offer the following information:

1. If the service true "remote" is employed, the service variable and the data module must offer information about all buffers employed via ADDR (buffer). the appertaining stub buffer is entered at this location for all remote procedures employed. The connection stub buffer <-> remote procedure is thus set up.

2. For optimization reasons, is must also be possible to directly employ RPCs (remote procedure calls). When, namely, the service request comes from the same address space (and the address of the remote procedure is valid), then the procedure can be directly called; the detour via CAST/RECEIVE functions with the assistance of the stub buffer is not necessary. For this purpose, the store size of the service is laid up a second time in the SPU data module. The addresses for the remote procedures are directly entered here.

Figure 2:
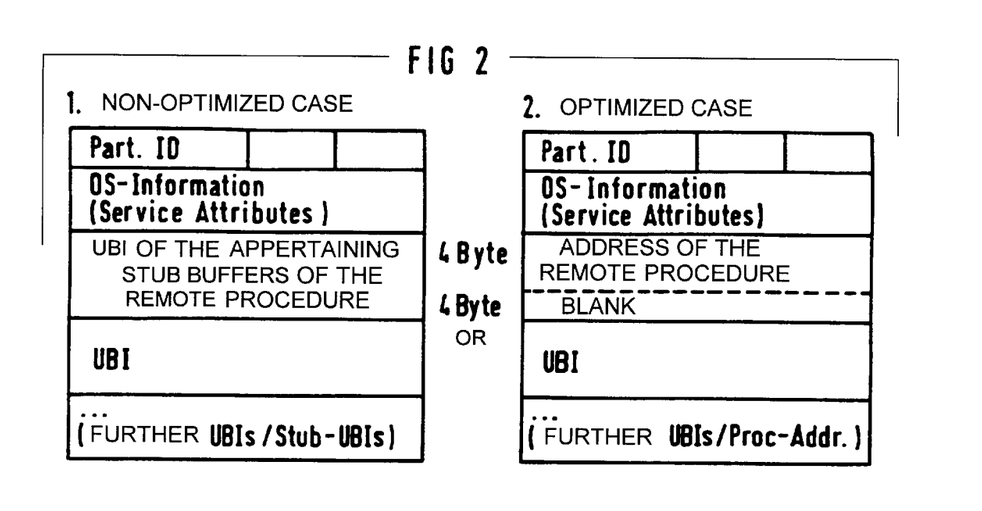
FIG. 2 shows the two-fold installation of memory location for a service variable (service instance) in the data module of the server SPU.

FIG. 2 shows the information deposited in the data module of the server SPU for the two cases cited above.

The linker reads these information deposited in the data module, enters the absolute addresses, and enters these service variables into its service table. This linker service table is then completed by the on line and off line builder and is made available to the service manager as a global service table (GST).

What is referred to as a communication path is required in order to program a CONNECT_SERVICE. Formally, this is a variable of the mode REF SERVICE_MODE. In this declaration, the compiler reserves memory in the data module.

Figure 3:
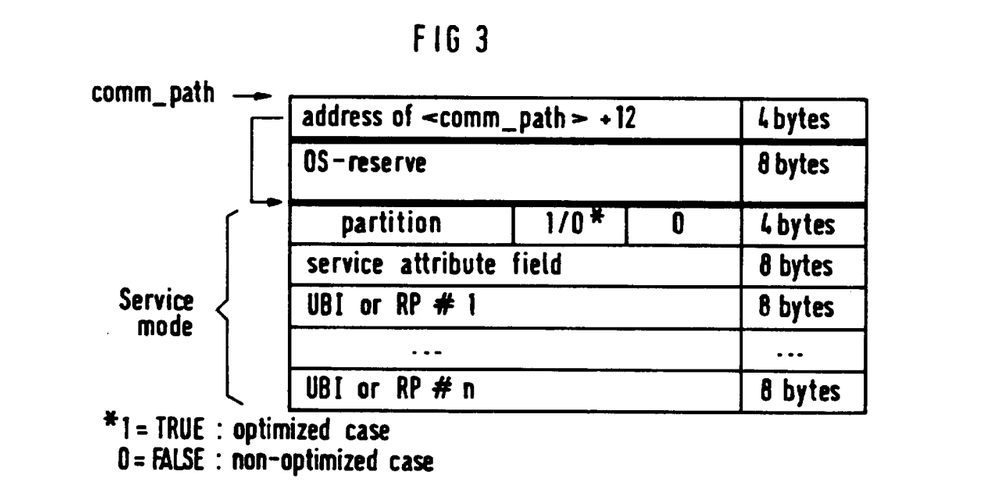
FIG. 3 shows the occupation of the memory for the variable comm_path in the data module of the client SPU.

FIG. 3 shows the occupation of the memory for the variable comm_path in the data module of the client SPU. The abbreviation "RP" thereby denotes "address of the remote procedure".

The service manager makes the decision whether an optimized or remote service request is present.

After the CONNECT_SERVICE, the UBIs or remote procedures of the service in the data module of the user are available for the user software. Via communication_path->. component The user can access the service components, i.e. can code a CAST to the UBIs or call the remote procedures (remote procedure call RPC).

Such RPCs coded in the user source cause the compiler to generate an implicit procedure (one for each RPC) that receives the parameters of the RPC and the communication path as parameters. This procedure is called an outgoing stub. A response buffer is also created in addition to it.

Precisely this outgoing stub is first called in every RPC, in that a decision as to whether the call is remote or not is made on the basis of the information in the communication path.

In the optimized case, the communication path directly contains the procedure address; the procedure is directly called.

In the remote case, the stub packages the RP (remote procedure) parameters into a message (together with the UBI of its own response buffer, quasi its "sender") and sends this to the stub buffer of the remote procedure (whose UBI is in the communication path).

When the response message arrives, the result of the sending operating is returned to the caller together with the result parameters.

The sequences that have been set forth shall be summarized again below and illustrated with reference to an example in CHILL source code.

As already set forth in greater detail, the following steps are run through for the service addressing:

1. The server declares buffer or programs remote procedures; for the latter, the compiler creates an incoming stub process and a stub buffer.

2. A service is declared in the service module of the server. The buffers, stub buffers and procedure addresses contained therein are written into the SPU-T module and are accepted into the global service table by the linker/builder.

3. The service is announced.

4. The service is seized in the client SPU and a communication path that accepts the service components is defined.

5. The user of the service calls the CONNECT_SERVICE. The service manager thereby enters the UBIs/RP addresses into the communication path, dependent on whether the optimized service or true "remote" is employed.

6. The user casts a message to a UBI component or calls an RP component. In RPC, the appertaining outgoing stub generated by the compiler is called.

7. The outgoing stub decides on the basis of a flag in the communication path whether the procedure is to be directly called or whether an RPC_CAST is to be implemented.

8. In the remote case, the parameters given to the stub are also packaged into a message for the remote procedure and are sent to the UBI of the stub buffer of the remote procedure with RPC_CAST.

9. The incoming stub process (that waits for CASTs at the stub buffer) receives the message from the stub buffer, reads the parameters out and directly calls the procedure.

10. After the conclusion of the procedure, the stub process packages the result parameters into a message and returns this to the calling outgoing stub.

11. The outgoing stub receives the result message, reads the parameters out and forwards them to its caller.

Figure 4:
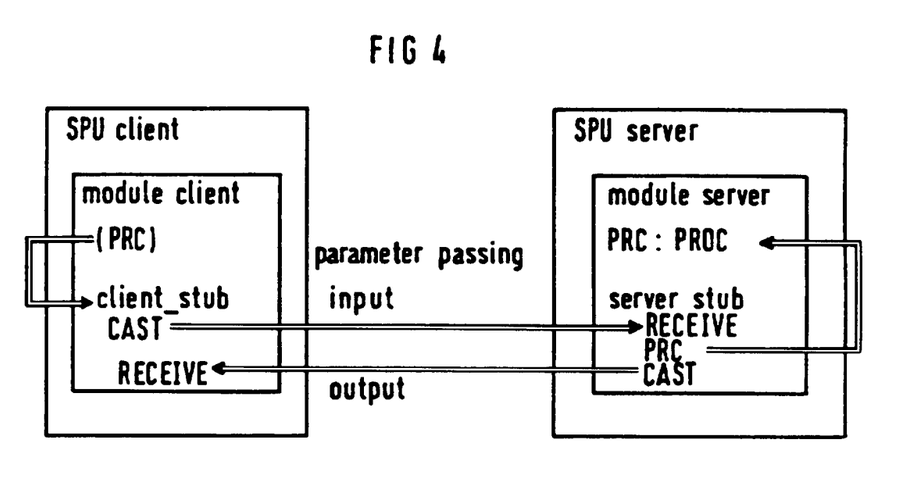
FIG. 4 shows the structure of a program example for realizing a location-independent communication.

FIG. 4 briefly illustrates an example of the service addressing presented below in the CHILL code. The abbreviation "OS" occurring in the CHILL example thereby means "operating system".

The code for a service module requesting a service (client SPU) follows first, as well as the CHILL-wise presentation of that code that is automatically generated by the compiler.

- 18 -

```
              <> SPU_CONTROL_HEADER
                  BUDGET_INFOS: BEGIN
                      HEAP_BUDGET           = 1,
15                    TIMER_PERIODIC_BUDGET = 2,
                      TIMER_ONE_OFF_BUDGET  = 2,
                  END<>

SPU_CLIENT: MODULE <>SPU<>
                  SEIZE
20                    PRC_SERV            /* Name of Service */
                      PRC_SERV_MODE       /* Service Mode   */
                      ID_MODE;            /* Partition-Id Mode */
                  CLIENT: MODULE REMOTE
                      <>PRODUCTION_PARAMETER
25                        BEGIN   SOURCE_TYPE = C   END<>;
              END SPU_CLIENT;
```

```
            CLIENT: MODULE
            SEIZE
                ONSMM00_CONTROL,         /* Control-Values            */
                ONSMM01_LOCATION,        /* Struct-Mode: GP, capsule,.. */
 5              ONSMM02_TOKEN,           /* Set Mode for Token        */
                ONPCM50_ERROR_CODE,      /* Result-Mode of CAST       */
                ONPCM53_EXCEPTION_CODE,  /* Result-Mode of the Stub-
                                                         Procedure    */
                PRC_SERV,
10              PRC_SERV_MODE,
                ID_MODE;                 /* Set-Mode for Partition    */
            DCL A, B INT, C CHAR;
            DCL CPATH     REF PRC_SERV_NODE;
            DCL GP_LOC    ONSMM01_LOCATION;
15          DCL CRESULT   ONPCM50_ERROR_CODE;

CRESULT:=CONNECT_SERVICE( CPATH,
                              PRC_SERV,
                              GP_LOC,    /* loc. Variable             */
                              INDENT_1   /* Partition-Id,             */
20                                       /* Mode = ID_MODE            */
                              NEW_VERSION ); /* OS set const          */
            CPATH->.PROC_FIELD1 (A, B, C)
                   ON ( STUB_BUFFER_OVERFLOW ): ;
                   ELSE ;
25                 END;
            /* The call of the remote procedure via the communication */
            /* Path initiates the compiler to generate the outgoing stub */
```

- 20 -

```
                END CLIENT;

/******************************************************/
        /* The following code is automatically generated by the compiler.  */
        /* It is enclosed in the module of the client and cannot be        */
5       /* influence by the user.                                          */
        /******************************************************/
        SEIZE
                CALL_MODE
                RP_MODE,
10              RESULT_MODE;
        /***        OS modes        ***/
                ONPCM56_SHORT_MESSAGE;  /* Header-Mode d. Message */

PROC_FIELD1_STUB: PROC (
                        A INT,
15                      B INT,
                        C CHAR LOC,
                        P_TIME_VALUE    INT,
                        P_COMM_PATH     REF PRC_SERV_MODE )
                        RETURNS ( ONPCM53_EXCEPTION_CODE );
20      /******************************************************/
        /* Function, so that the exception can be returned.    */
        /******************************************************/
        DCL
                LCALL_MSG       CALL_MODE
25              LRESULT         RESULT_MODE,
                LSUCCESS        ONPCM53_EXCEPTION_CODE;
```

- 21 -

```
                                    /* OS-defined set mode */
              IF P_COMM_PATH->.LOCAL_FLAG
              THEN
                 /******************************************************/
 5               /* Direct procedure call since in the same address space.   */
                 /* Here, PROC_FIELD1 is a procedure, not UBI!               */
                 /******************************************************/
                       P_COMM_PATH->.PROC_FIELD1  ( A, B, C );
              ELSE
10               /******************************************************/
                 /* Transfer parameters to the message, PROC_FIELD1 is a UBI!   */
                 /******************************************************/
                 DO WITH LCALL_MSG;
                 /***   Allocate header field and parameters to      ***/
15                  DO WITH PARAMS;
                         AA := A;
                         BB := B;
                         CC := C;
                     OD;              /* DO WITH PARAMS     */
20               OD;                  /* DO WITH LCALL_MSG  */
                 /******************************************************/
                 /* Call the remote procedure PRC: CAST message              */
                 /******************************************************/
                 LSUCCESS := RPC_CAST ( P_COMM_PATH->.PROC_FIELD1,
25                               L_CALL_MSG,   /* Send-message   */
                                 LRESULT,      /* Result-message */
                                 P_TIME_VALUE  );
```

- 22 -

```
          /******************************************************************/
          /* Return LOC parameters and exception                            */
          /******************************************************************/
          C      := LRESULT.PARAMS.CC;
 5        RESULT LSUCCESS;
          FI;   /* IF PROCVAR /= NULL */
          END PROC_FIELD1_STUB;
```

The code for the requested service module (server SPU) as well as the automatically generated code for the incoming stub now follow.

```
10        <>SPU_CONTROL_HEADER
              BUDGET_INFOS: BEGIN
                      HEAP_BUDGET              =1,
                      TIMER_PERIODIC_BUDGET    =2,
                      TIMER_ONE_OFF_BUDGET     =2
15            END <>
          SPU_SERVER: MODULE <>SPU<>
              SEIZE
                  ONSMM03_ATTRIBUTES;  /* Mode for system status field */
              GRANT
20                PRC_SERV
                  PRC_SERV_MODE, RP_MODE,
                  ID_MODE;
              DCL PRC_SERV PRC_SERV_MODE
                      INIT := (: IDENT_1, (::), PRC );
25        DATMOD: MODULE REMOTE
                  <>PRODUCTION_PARAMETER
                      BEGIN   SOURCE_TYPE = C  END <> ;
          SERVER: MODULE REMOTE
```

- 23 -

```
           <>PRODUCTION_PARAMETER
                 BEGIN   SOURCE_TYPE = C   END <> ;
           END SPU_SERVER

<>MODULE_DESCRIPTION_HEADER
5             REMOTE_PROC_INFOS:     BEGIN
                  PROC_NAME       =   PRC,
                  PROCESS_CLASS   =   CALL_PROCESSING,
                  PRIORITY        =   2
               END<>
10         SERVER: MODULE
           /*****************************************************************/
           /* This module writes the programmer of the server            */
           /*****************************************************************/
           GRANT PRC, RP_MODE, ID_MODE;
15         SYNMODE ID_MODE = SET (DUMMY_IDENT, IDENT_1, IDENT_2,
           IDENT_3;
           SYNMODE RP_MODE = PROC (INT, INT, CHAR LOC)
           <>REMOTE_PROCEDURE<>;
           PRC:PROC (A INT, B INT, C CHAR LOC) <>REMOTE_PROCEDURE<>;
20         /*****************************************************************/
           /* The directive REMOTE_PROCEDURE initiates the compiler to   */
           /* generate the stub process.                                 */
           /*****************************************************************/
           ;
25         END PRC;
           END SERVER;
```

- 24 -

```
/****************************************************************/
/* PIF module for service mode                                  */
/****************************************************************/
DATMOD: MODULE
  GRANT    PRC_SERV_MODE;
  SEIZE    ID_MODE, RP_MODE, ONSMM03_ATTRIBUTES;
  SYNMODE PRC_SERV_MODE = STRUCT ( ID_FIELD   ID_MODE,
                                   SERV_ATTR  ONSMM03_ATTRIBUTES,
                                   PROC_FIELD1 RP_MODE )
                                       <>SERVICE<>;
  ;
  END DATMOD;
/****************************************************************/
/* Code is then generated that corresponds to the following CHILL code: */
/****************************************************************/
GRANT
  CALL_MODE
  RESULT_MODE;
SEIZE
  ONPCM50_ERROR_CODE;    /* General OS-Result-Mode */
  ONPCM56_SHORT_MESSAGE;    /* Header-Mode for Message */
SYNMODE
  RESULT_MODE = STRUCT (HEADER ONPCM56_SHORT_MESSAGE,
                        CC     CHAR )
                  <>MESSAGE
                     CAT = 0
                     JC  = 0<>
  CALL_MODE = STRUCT ( HEADER ONPCM56_SHORT_MESSAGE,
```

- 25 -

```
                        PARAMS STRUCT ( AA,
                                       BB INT,
                                       CC CHAR ),
                        RESULT_UBI_PTR REF <>REMOTE_REFERENCE<>
5                                      RESULT_BUF_MODE  )
            <>MESSAGE
              CAT = 0
              JC  = 0<>
          CALL_BUFF_MODE  = BUFFER (100) CALL_MODE; /* size 100 = */
10                                                 /* imp.-defined */
          DCL
              CALL_BUF CALL_BUF_MODE  <>THREADED<>;
          /****************************************************************/
          /* This process waits for the message                          */
15        /****************************************************************/
          PRC: PROCESS ():
          DCL
              LCALL_MSG     CALL_MODE,
              LRESULT_MSG   RESULT_MODE,
20            LSUCCES       ONPCM50_ERROR_CODE;
          DO FOR EVER
          /****************************************************************/
          /* Receive the message                                         */
          /****************************************************************/
25        LCALL_MSG := RECEIVE CALL_BUF;
          DO WITH LCALL_MSG;
          /****************************************************************/
          /* Call the procedure                                          */
```

- 26 -

```
/******************************************************************/
        PRC ( PARAMS.AA, PARAMS.BB, PARAMS.CC );
/******************************************************************/
/* Send result parameter back to caller                           */
/******************************************************************/
        LRESULT_MSG.CC := PARAMS.CC;
        LSUCCESS :=   CAST (  RESULT_UBI_PTR,
                              LRESULT_MSG /* (...)*/);
    OD;      /* DO WITH */
    OD;      /* DO FOR EVER */
    END PRC;
```

We claim:

1. In a computer, a programming language system for generating a program system of a real-time computer system on a high level language, comprising:
   a) modules for modularizing the program system that comprise procedures and data types that are objects;
   b) a specific data type being a service type that describes a communication interface that comprises at least one reference to said objects;
   c) a declaration instruction for static generation and initialization of an instance of the service type that is a service instance, that is announced to an operating system to be implemented on computer hardware;
   d) a connection instruction to the operating system for the dynamic set-up of a connection to a service, which hands over a value variable for the acceptance of the name of the requested service as well as a return parameter to the operating system as input parameters, a reference variable that is a communication path under whose reference data instance the operating system stores said at least one reference to said object of a service instance selected by the operating system;
   e) communication instructions for implementation of communications to services.

2. A programming language system according to claim 1, wherein said service type comprises a version identifier field via which a service instance tells the operating system for implementation on a computer what version of service accessible via said service instance comprises.

3. A programming language system according to claim 1, wherein said service type comprises a system status field via which a service instance instructs the operating system for implemenation on a computer to ignore certain system statuses in view of implementation of a request given a request of a service via said service instance.

4. A programming language system according to claim 1, further comprising: a service module that only exports service interfaces as external objects.

5. A programming language system according to claim 1, further comprising:
   a) one of the communication instructions for implementation of the communication to a service is a remote procedure call;
   b) the programming language system generates a transmission procedure in a translation of the remote procedure call, said transmission procedure comprising a procedure object reference as a parameter;
   c) the transmission procedure decides on a basis of a value of said procedure object reference whether the remote procedure call is truly remote or not remote;
   d) the transmission procedure in case of a remote procedure call that is truly remote packages the parameters of the remote procedure call into a message and sends the message to a reception buffer of an appertaining remote procedure;
   e) the transmission procedure directly calls a called local procedure in case of a local remote procedure, while specifying a value of the procedure object reference.

6. In a computer system, a programming language system for generating a program system of a real-time computer system on a high level language, comprising:
   a) modules for modularizing the program system that comprise procedures and data types that are objects;
   b) a specific data type being a service type that describes a communication interface that comprises at least one reference to said objects;
   c) a declaration instruction for static generation and initialization of an instance of the service type that is a service instance, that is announced to an operating system to be implemented on computer hardware;
   d) a connection instruction to the operating system for the dynamic set-up of a connection to a service, which hands over a value variable for the acceptance of the name of the requested service as well as a return parameter to the operating system as input parameters, a reference variable that is a communication path under whose reference data instance the operating system stores said at least one reference to said object of a service instance selected by the operating system;
   e) communication instructions for implementation of communications to services, wherein said service type comprises a partition field for which a corresponding value is recited in the connection instruction and that enables an unambiguous identification of a service instance for the operating system.

7. A programming language system according to claim 6, wherein said partition field of a service instance is statically seized within a framework of the declaration instruction in a computer system.

8. A programming language system according to claim 7, wherein said partition field of a service instance is dynamically seized by a specific instruction in a computer system and an availability range of said service instance is dynamically varied. A programming language system in a high level language should comprise language means that enable a reliable and purely logical programming of a locally transparent communication between programs sequencing parallel. This is enabled by the introduction of a specific data type, that is referred to as the service type, that combines references to components (objects) of a service to form a service interface that is announced to the operating system.

9. A computer-implemented method for generating a program system of a real-time computer system on a high level language, comprising the steps of:

providing modules for modularizing the program system that comprise procedures and data types that are objects;

describing a communication interface as a specific data type which is a service type including at least one reference to said objects;

announcing to an operating system to be implemented on computer hardware a declaration instruction for static generation and initialization of an instance of the service type which is a service instance;

providing a connection instruction to the operating system for dynamic set-up of a connection to a service, said connection instruction handing over a value variable for acceptance of the name of the requested service as well as a return parameter to the operating system as input parameters;

selecting a reference variable that is a communication path under whose reference data instance the operating system stores said at least one reference to said object of a service instance by the operating system; and providing communication instructions for implementation of communications to services.

10. A method as claimed in claim 9, further comprising the steps of:

providing a remote procedure call as one of the communication instructions for implementation of the communication to a service;

generating a transmission procedure in a translation of the remote procedure call in the programming language system, said transmission procedure being a procedure object reference as a parameter;

deciding the transmission procedure on a basis of a value of said procedure object reference whether the remote procedure call is truly remote or not remote;

packaging the parameters of the remote procedure call into a message and sending the message to a reception buffer of an appertaining remote procedure in case of a remote procedure call that is truly remote;

directly calling a called local procedure in case of a local remote procedure, while specifying a value of the procedure object reference.

* * * * *